March 24, 1931. F. DUSTAN ET AL 1,797,945
ENTERING TABLE FOR SHEARING MACHINES
Filed Jan. 27, 1930
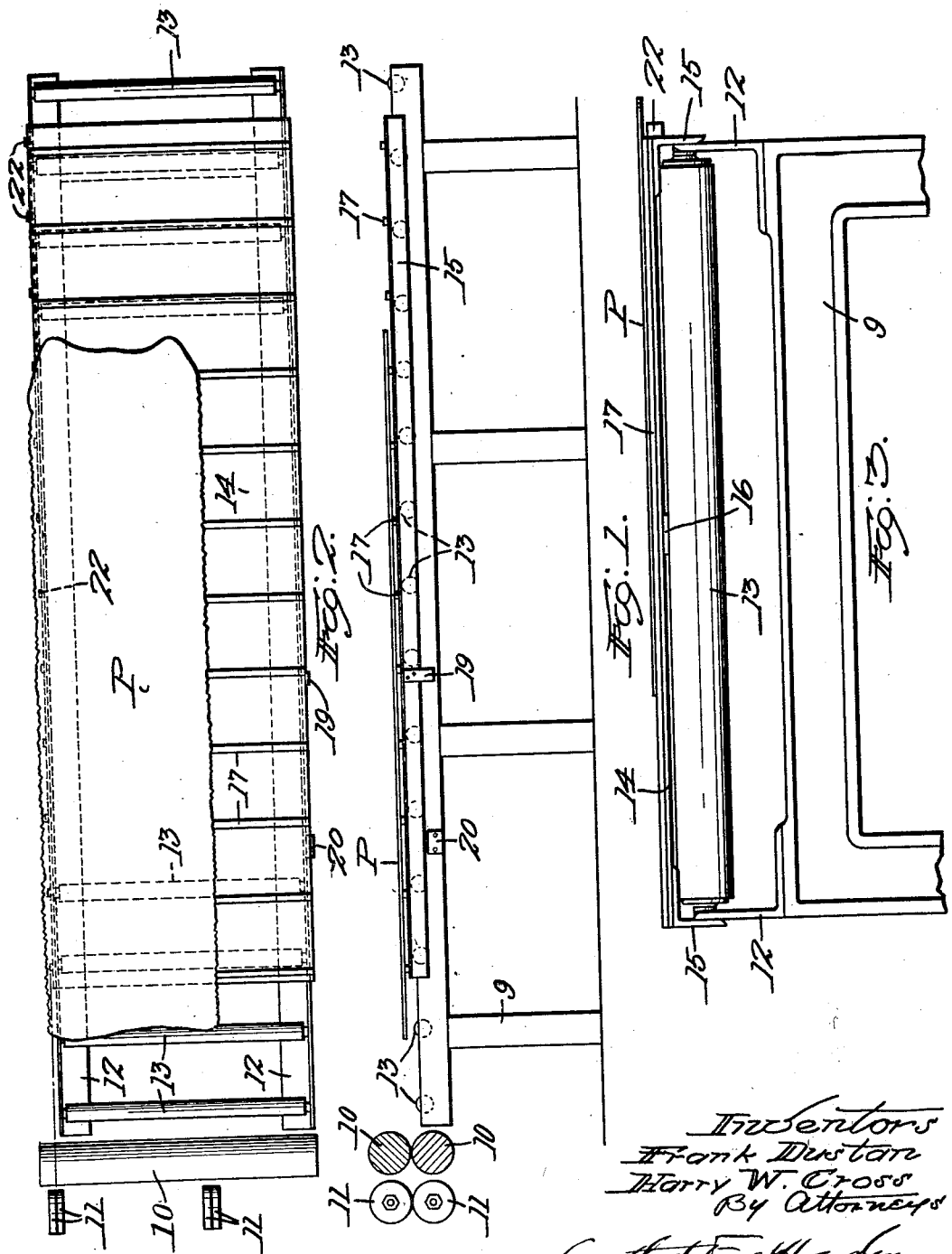

Patented Mar. 24, 1931

1,797,945

UNITED STATES PATENT OFFICE

FRANK DUSTAN AND HARRY W. CROSS, OF WILKINSBURG, PENNSYLVANIA, ASSIGNORS TO MANNING, MAXWELL & MOORE, INC., OF NEW YORK, N. Y., A CORPORATION OF NEW JERSEY

ENTERING TABLE FOR SHEARING MACHINES

Application filed January 27, 1930. Serial No. 423,587.

This invention relates to an entering table for supporting and guiding sheets or packs into an edge shearing machine.

The principal objects of the invention are to provide a device for supporting the sheets or packs and guiding them in a straight line into the rolls which take them through the shears which will be convenient to operate and accurate in action; to provide this table in the simplest possible form to prevent swerving of the pack when pushed forward and to provide an arrangement in which the operator can definitely govern the amount of scrap that is going to be cut off the right hand side of the pack and thus be assured that an even amount of scrap will be cut from each side and, what is more important, be assured that the pack will "clean up" when passed through the shear and not have one of the side cuts run out of the metal before reaching the end which would cause the pack to be scrapped or necessitate its being trimmed down to a smaller size in order that the sheets would not be totally ruined.

Other objects and advantages of the invention will appear hereinafter.

Reference is to be had to the accompanying drawings in which

Fig. 1 is a side view of the entering rolls and cutters of an edge trimming machine with a preferred form of this invention applied thereto in the form of an entering table;

Fig. 2 is a plan of the same showing a pack on the table, and

Fig. 3 is an end elevation.

This entering-in frame 9 for supporting the packs which are fed into the feed-in rolls 10 adjacent to the edge cutters 11 of an edge trimming machine for packs is located, of course, in front of the rolls 10. It supports a pair of angle irons 12 at opposite sides which support rolls 13. The angle bars extend the length of the feeding-in mechanism and the rollers are located at intervals along the same. Instead of feeding the packs on these rollers 13 as has been customary we provide a table 14 under the edges of which are placed angle irons 15 smaller than the angle irons 12 and located with their flanges just outside them. These are welded to the table and a central strip 16 also the same thickness as the angles is welded along the center. To the table are welded cross pieces 17 which themselves support the packs to be fed in.

It will be seen that this table extending along the feed-in mechanism is of sufficient length to support the packs P and that these packs can be lined up on the right side as shown in Fig. 2 in alignment with the right-hand pair of cutters 11 and arranged to have the desired amount of scrap taken off so that the pack will clean up when passed through the machine.

Also it will be seen that as the packs are located on a table which must run accurately on account of the angle irons at the edges and, pressed down by the workmen, the pack is bound to be fed into the feed rolls 10 and cutters 11 in an accurate manner. This solves a serious difficulty that has been present in connection with the operation of edge trimming machines for packs. These packs have usually been fed in over rollers and have had a chance to swerve to the right or left and there was no certainty of their being introduced in the right position. There was nothing to gauge them that was effective and accurate unless a very complicated mechanism were used. The result was that many of them got into the shears in a twisted direction and consequently were spoiled. These things have given much trouble and increased the cost of production.

On the angle iron 15 is located a stop 19 and on the stationary angle iron 12 is located another stop 20. Now in the operation the shearman pulls the pack over the right edge as shown in Fig. 2 just as far as he desires to provide for the amount he wishes to cut off this side. The right hand edge of the movable table top is set in line with the cutting edge of the cutters on this side of the machine. He has a stationary table and the pack which he can manipulate to his own satisfaction and he can also see just how it is going to go through the cutter. Then he and his helper bear down on the pack and push it with the table forward until the front end of the pack enters the feed roll. The stop 19 engages the stop 20 at this point and prevents the table hitting the feed rolls.

In this way all doubt as to how much scrap is going to be cut off the right hand side has been removed. Enough is taken off to allow a sufficient amount to be left on the other side to clean up the rough pack. A number of height gauges 22 are provided along the right hand side of the table. These gauges show the operator how much of the pack he has pulled over this edge and consequently how much scrap will be removed by the shear.

Although we have illustrated and described only one form of the invention we are aware of the fact that modifications can be made therein by any person skilled in the art without departing from the scope of the invention as expressed in the claims.

Therefore we do not wish to be limited in this respect but what we do claim is:—

1. The combination with an edge shear having a pair of feed-in rolls, of a support consisting of a series of rollers parallel with the feed-in rolls and a table for supporting the packs resting on said rollers and movable manually thereon toward the feed-in rolls.

2. In a feed-in device for a pack shearing machine, the combination of a stationary table, a pair of angle irons supported at the edges of said table and having one flange of each projecting upwardly at opposite sides of the table, freely rotating rollers carried by said upwardly projecting flanges, a table supported by said rollers for carrying the sheets or packs and means extending down from the last named table to the upwardly extending flanges for guiding the table to move in a straight line.

3. In a feed-in device for a pack shearing machine, the combination of a stationary table, a pair of angle irons supported at the edges of said table and having one flange of each projecting upwardly at opposite sides of the table, freely rotating rollers carried by said upwardly projecting flanges, a table supported by said rollers for carrying the sheets or packs, and a pair of angle irons supported on the lower side of said table, each having a projecting flange extending downwardly to the upwardly extending flanges of the other angle irons, constituting guides.

4. In a feed-in device for a pack shearing machine, the combination of a stationary table, a pair of angle irons supported at the edges of said table and having one flange of each projecting upwardly at opposite sides of the table, freely rotating rollers carried by said upwardly projecting flanges, a table supported by said rollers for carrying the sheets or packs, a pair of angle irons supported on the lower side of said table, each having a projecting flange extending downwardly to the upwardly extending flanges of the other angle irons, constituting guides, and stops on the respective angle irons for preventing the table from moving too far.

In testimony whereof we have hereunto affixed our signatures.

FRANK DUSTAN.
HARRY W. CROSS.